United States Patent
Peterson

[11] 3,895,283
[45] July 15, 1975

[54] TEMPERATURE RESPONSIVE BATTERY CHARGING CIRCUIT

[75] Inventor: Bruce E. Peterson, Northbrook, Ill.

[73] Assignee: Vapor Corporation, Chicago, Ill.

[22] Filed: Nov. 26, 1973

[21] Appl. No.: 419,116

[52] U.S. Cl. .................. 320/35; 320/36; 320/39; 322/28; 323/75 H; 320/61
[51] Int. Cl. ............................................. H02j 7/14
[58] Field of Search ............ 320/35, 36, 68, 64, 39, 320/40, 31, 32, 61; 323/75 H; 322/28

[56] References Cited
UNITED STATES PATENTS

| | | | |
|---|---|---|---|
| 3,296,516 | 1/1967 | Paine et al. | 320/35 |
| 3,496,443 | 2/1970 | Snedeker et al. | 320/68 X |
| 3,522,482 | 8/1970 | Thompson | 320/39 UX |
| 3,553,565 | 1/1971 | Ebbinge et al. | 320/35 X |
| 3,585,482 | 6/1971 | Zelina | 320/35 X |
| 3,688,581 | 9/1972 | Le Quernec | 323/75 H X |
| 3,736,489 | 5/1973 | Mullersman | 320/35 |
| 3,754,442 | 8/1973 | Arnett | 323/75 H X |
| 3,755,729 | 8/1973 | Kuttner | 320/32 X |

FOREIGN PATENTS OR APPLICATIONS 1,298,062  11/1972  United Kingdom .................. 320/35

*Primary Examiner*—J. D. Miller
*Assistant Examiner*—Robert J. Hickey
*Attorney, Agent, or Firm*—Lloyd L. Zickert

[57] ABSTRACT

A battery charging circuit for use in aircraft wherein a voltage-regulated alternator is employed to maintain a nickel cadmium battery charged. A temperature-dependent resistance element thermally coupled to the battery provides a reference voltage against which battery terminal voltage is compared. When the terminal voltage falls below the reference voltage application of sensing voltage to the alternator voltage regulator is interrupted, causing full charging current to be applied to the battery. When the terminal voltage exceeds the reference voltage, sensing voltage is reapplied to reduce charging current. The alternator switches between maximum and minimum charging efforts to maintain a voltage level dictated by the battery temperature.

10 Claims, 3 Drawing Figures

TEMPERATURE RESPONSIVE BATTERY CHARGING CIRCUIT

This invention relates in general to battery charging systems, and more particularly to a thermally-responsive protection circuit for preventing thermal runaway in nickel cadmium batteries.

Nickel cadmium batteries, because of their high current capacity, light weight, and ability to operate in a sealed housing, have come into wide use on vehicles such as aircraft where large electrical loads must be handled while keeping weight to a minimum. The nickel cadmium batteries are typically kept in a charged state by application of a constant-voltage unidirectional current obtained from one or more voltage-regulated generators or alternators driven by the engines of the aircraft. The charging current to the batteries from the constant-voltage alternators is initially large, and tapers off to a trickle as the batteries near full charge. The tapering effect is due to the gradual build-up of the battery voltage (which opposes the charger voltage) as the battery's charge is restored. Unfortunately, the opposing voltage produced by nickel cadmium batteries decreases with increased battery temperature, making these batteries subject to thermal runaway condition.

This condition can develop when the temperature of the batteries is substantially increased, either initially, as from the prolonged cranking of a difficult-to-start engine, or externally, as from a high ambient temperature in the battery compartment. If the resulting initial charging current is sufficiently high, sufficient heat may be generated to overcome the thermal inertia of the battery and cause the battery temperature to rise. This will result in a further decrease in the opposing voltage and a still greater charging current, establishing a self-perpetuating runaway condition which, if allowed to continue, will eventually damage or ignite the battery.

The level at which the battery voltage is maintained while charging can be set by making circuit adjustments within the voltage regulators of the aircraft alternators, and heretofore the practice has been to adjust the battery terminal voltage according to the ambient conditions in which the aircraft was to be operated. That is, while operating in hot regions it was a practice to reduce the battery terminal voltage, and while operating in cold regions the battery terminal voltage was increased. This did have the effect of reducing the tendency for thermal runaway from external ambient heating of the battery, but was not effective in preventing a runaway condition from developing from internal heating of the battery, as might result from a prolonged engine starting effort. Accordingly, the need has existed for a battery charging system which compensates for internal heating as well as external heating of the battery.

Often, existing DC power systems in aircraft and other vehicles do not lend themselves to modifications, and major component changes and rewiring therein can only be accomplished at great cost and with a large expenditure of time. Accordingly, in such systems which employ nickel cadmium batteries the need has developed for a battery protection circuit for protecting the batteries from thermal runaway which does not require extensive rewiring of the system or replacement of primary components within the system.

Accordingly, it is a general object of the present invention to provide a new and improved and safer charging system for nickel cadmium batteries or the like which prevents a thermal runaway condition from developing.

It is another object of the present invention to provide a new and improved and safer charging system for nickel cadmium batteries or the like which adjusts the charging rate of the battery according to the temperature of the battery to prevent a thermal runaway condition from developing.

It is another object of the present invention to provide a new and improved charging system for nickel cadmium batteries or the like wherein the application of charging current to the battery is interrupted when the battery exceeds a predetermined maximum terminal voltage related to the temperature of the battery.

It is another object of the present invention to provide a circuit for preventing thermal runaway of a nickel cadmium battery or the like in a vehicle having a constant-voltage alternator. It is another object of the present invention to provide a battery charging circuit for nickel cadmium batteries wherein the batteries are protected from thermal runaway caused by either internal or external heating of the battery.

It is another object of the present invention to provide a charge rate control circuit which may be added to the constant-voltage battery charging system of an aircraft with minimal modifications thereto to prevent thermal runaway of nickel cadmium batteries contained therein.

The invention is directed, in a system for charging a nickel cadmium battery or the like which includes a source of unidirectional charging current and a voltage regulator for controlling the output voltage of the unidirectional current source in accordance with an applied sensing voltage, to a charge control circuit for protecting the battery from thermal damage. The circuit comprises temperature sensing means comprising a sensor in thermal communication with the battery for generating a temperature-dependent reference signal, and battery charge control means responsive to the reference signal and to the terminal voltage of the battery for controlling the application of sensing voltage to the voltage regulator to reduce the potential for thermal runaway in the battery.

Other objects, features and advantages of the invention will be apparent from the following detailed disclosure, taken in conjunction with the accompanying sheets of drawings, wherein like reference numerals refer to like parts, in which.

While the system finds application in various types of vehicles, it is particularly useful in connection with aircraft electrical systems. In such systems nickel cadmium batteries are typically provided for starting the aircraft engines and for operating various communications and navigation and environmental control equipment in flight, and one or more voltage-regulated alternators or generators are provided for maintaining a charge on the batteries.

Figure 1:
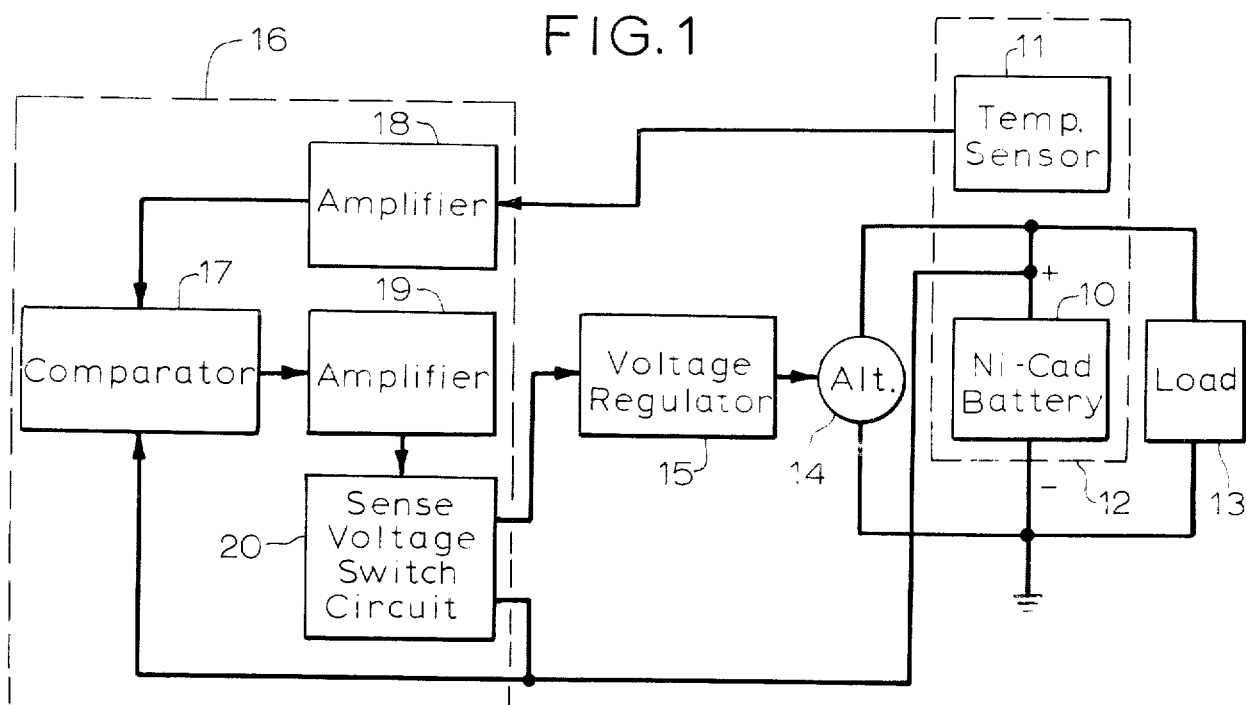
FIG. 1 is a functional block diagram of the battery charging system of the present invention.

Referring to FIG. 1, an aircraft-type constant voltage battery charging system is shown which includes a nickel cadmium battery 10. A temperature sensor 11 is maintained in thermal communication with the nickel cadmium battery 10 either by being incorporated within the battery housing 12, or by being implanted within one of the cells of the battery. The battery, which will be understood to include a plurality of series-connected cells, has conventional positive and negative output terminals. These terminals are connected to the various systems of the aircraft, which in FIG. 1 are collectively illustrated as load 13.

The battery ouput terminals are also connected to a source of unidirectional charging current, which may comprise a generator or alternator 14 of conventional design and construction. In accordance with current practice this generator or alternator is preferably provided with a voltage regulator 15 which adjusts the excitation to the alternator so as to maintain a constant output voltage across the battery terminals, notwithstanding changes in the power settings of the aircraft engines or changes in the electrical load. Voltage regulator 15, which may be conventional in design and construction, is provided with input terminals for sensing battery voltage, and with output terminals for supplying a unidirectional current to the field windings of the alternator at a current level inversely related to the battery terminal voltage.

In accordance with the invention, the battery charging system of the present invention provides for interruption of the exciting voltage applied to alternator 14 when the battery terminal voltage exceeds a predetermined maximum level dependent on the operating temperature of the battery 10. Referring to FIG. 1, this is accomplished by means of a battery protection circuit 16, which may be readily added by modification to an existing nickel cadmium DC power system, such as battery 10, load 13 and alternator 14 in FIG. 1. Protection circuit 16 includes a voltage comparator 17 which compares a first input, the battery terminal voltage, with a second input, a reference voltage related to the temperature of the battery. The reference signal is developed by coupling temperature sensor 11, which it will be recalled is in thermal communication with battery 10, to a voltage amplifier 18. Amplifier 18 includes appropriate circuitry for developing from the resistance change in sensor 11 a DC reference signal suitable for application to comparator 17.

When the battery terminal voltage, as applied to comparator 17, exceeds the level of the temperature-dependent reference signal, an output signal is produced by comparator 17. This signal is applied to a voltage amplifier 19, wherein it is amplified to a level suitable for controlling a sense voltage switch circuit 20, which is arranged in series between battery 10 and the voltage sensing terminals of voltage regulator 15 for the purpose of selectively enabling or disabling the voltage regulator, as called for by the amplified output of voltage comparator 17. When the terminal voltage of battery 10 falls below the temperature-dependent reference voltage, no output is produced by comparator 17 and switch circuit 20 is conditioned open, causing voltage regulator 15 to provide maximum excitation to alternator 14. Conversely, when the terminal voltage of battery 10 exceeds the temperature-dependent reference signal, switch 20 is conditioned closed, causing voltage regulator 15 to provide reduced excitation to the alternator.

In operation, voltage regulator 15 rapidly fluctuates between maximum and minimum charge conditions as the voltage across battery 10 rises and falls relative to the temperature-dependent reference signal. When voltage regulator 15 is operative and alternator 14 is enabled the voltage level across the terminals of battery 10 rapidly increases. When this level reaches the level of the temperature-dependent signal applied to comparator 17 switch circuit 20 is conditioned closed, reducing excitation to alternator 14. The battery terminal voltage now quickly falls below the temperature-related reference voltage causing voltage regulator 15 to again apply increased excitation, and the battery terminal voltage to rise. In practice, the alternation cycle takes place at a rate in the order of 500 to 1000 cycles per second.

Figure 2:
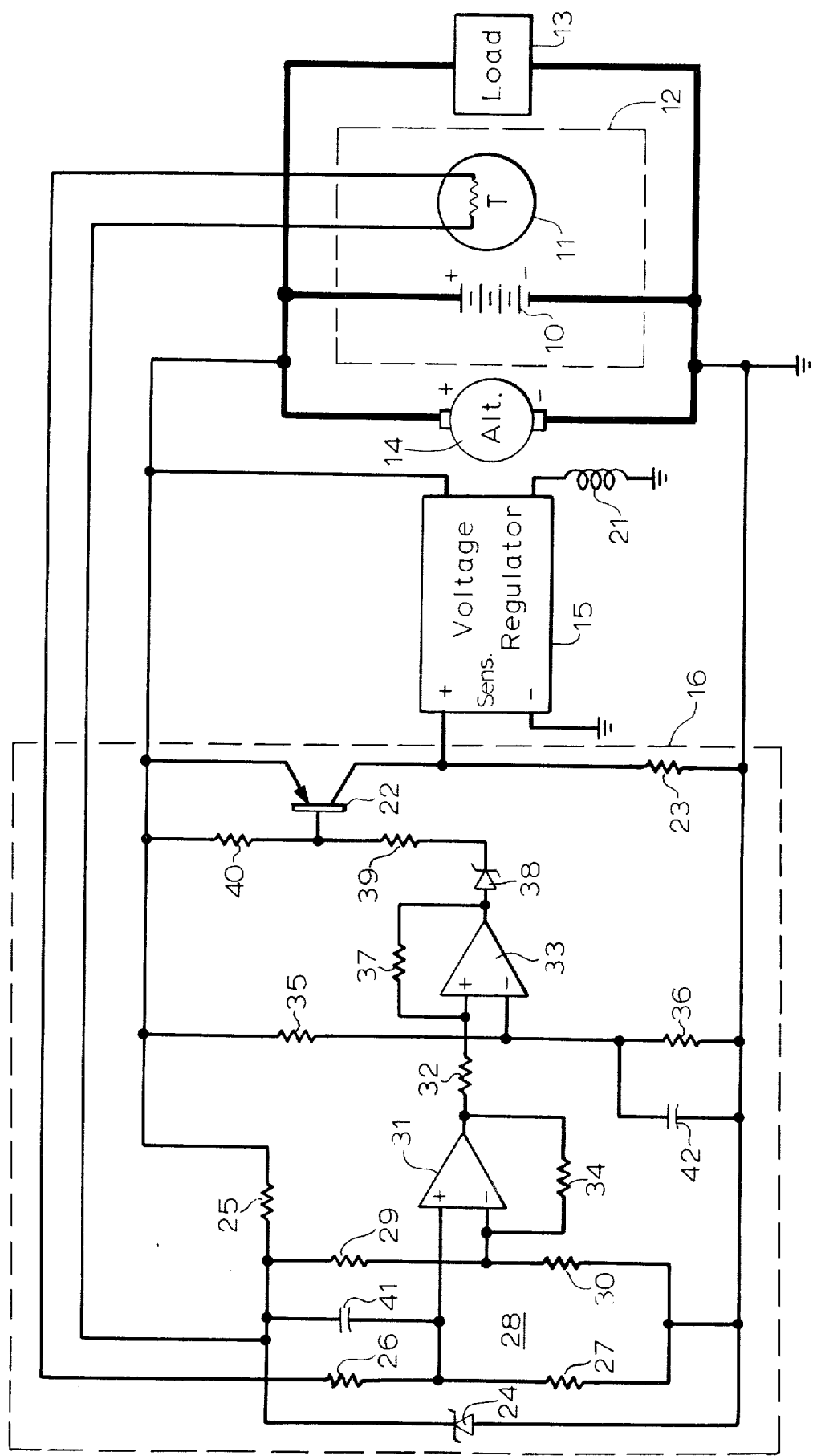
FIG. 2 is a schematic diagram, partially in block form, of the battery charging system illustrated in FIG. 1.

A preferred circuit arrangement for the battery protection circuit 16 is shown in FIG. 2. As before, the aircraft alternator 14 is shown connected in parallel with the output terminals of battery 10 and the electrical load 13 of the various aircraft systems. A temperature sensing element 11 in the form of a positive temperature coefficient wire-type variable resistance element is disposed within the battery case 12 in close thermal proximity to battery 10. In practice, this sensor may be either molded into the case or suspended in the electrolyte of one of the battery cells. one output terminal of voltage regulator 15 is connected to one terminal of the excitation or field winding 21 of alternator 14. The other terminal of winding 21 is connected to ground and the other output terminal of regulator 15 is connected to a source of positive polarity unidirectional current, in this instance the positive Dc bus or positive battery terminal.

Voltage regulator 15 includes positive and negative input terminals for receiving a sensing voltage or appropriate polarity for use in maintaining the output voltage of alternator 14 at a predetermined level. The positive polarity terminal is connected to a source of positive-polarity unidirectional current by switch means in the form of a PNP transistor 22, and to ground through a resistor 23. The negative polarity sensing terminal is connected to ground.

When transistor 22 is conditioned conductive a positive polarity unidirectional current at a voltage level approximately equal to that of battery 10 is applied to the sensing terminals of regulator 15. Conversely, when transistor 22 is conditioned non-conductive no voltage is applied to the sensing terminals. As will be seen presently, this enables the alternator 14 to be alternately operated at full charge and no charge modes.

To obtain a battery temperature-dependent reference signal one terminal of sensor 11 is connected to a constant potential unidirectional source formed by a zener diode 24 and a series dropping resistor 25. Zener diode 24 and resistor 25 are connected in series between the positive-polarity battery bus and ground, and sensor 11 is connected to the juncture thereof. The ther terminal of temperature sensor 11 is connected to ground through series-connected resistors 26 and 27, which comprise one leg of a four-element resistive bridge network 28. The other side of the bridge network comprises series-connected resistors 29 and 30, which are connected between the juncture of zener diode 24 and resistor 25, and ground.

The juncture of resistors 26 and 27 is connected to the positive or non-inverting input terminal of a differential amplifier 31, and the juncture of resistors 29 and 30 is connected to the negative or inverting terminal of this amplifier The output of differential amplifier 31 is connected by a resistor 32 to the positive or non-inverting input of a comparator amplifier 33, and by a resistor 34 back to the negative or inverting input of amplifier 31 to provide degenerative feedback for counteracting long-term gain variations within the device.

In operation the resistive bridge circuit 28, temperature sensor 11, and differential amplifier 31 generate a reference signal which varies inversely with the temperature of the battery. This is because the resistance of sensor 11 varies directly with the temperature of battery 10, causing the voltage applied to the non-inverting input of amplifier 31 to vary inversely with temperature. Since the inverting input of amplifier 31 is held at a constant potential by resistors 29 and 30, which function as a voltage divider for applying to this input a portion of the regulated voltage developed across zener diode 24, the reference signal developed at the output of amplifier 31 varies inversely with battery temperature. The absolute voltage level of this reference signal for any given battery temperature can be predetermined by selection of appropriate values for resistors 26, 27, 29 and 30, and by selection of an appropriate zener diode 24, in a manner well known to the art.

Differential amplifier 33 is connected as a voltage comparator, and as such compares the voltage levels of signals applied to its inverting and non-inverting inputs. The temperature related reference signal developed at the output of differential amplifier 31 is applied to the non-inverting input, and a signal indicative of battery terminal voltage, as sensed by means of a pair of resistors 35 and 36 serially connected between the positive polarity battery bus and ground, is applied to the inverting input. When the sensed battery voltage is at a higher level than the reference voltage developed at the output of amplifier 31, comparator amplifier 33 switches to a low output state, wherein its output with reference to other elements in the circuit is approximately at or equal to 0 volts or ground potential. When the sensed battery voltage is lower than the reference voltage, comparator amplifier 33 switches to a high output state, wherein its output assumes a positive potential, typically in the order of 15.0 volts. A resistor 37 is connected between the output and the non-inverting input of comparator amplifier 33 to provide regenerative feedback for a desired position transition between the high and low states.

The output of comparator amplifier 33 is connected by a zener diode 38 and a resistor 39 to the base of transistor 22, which it will be recalled serves as a switch to selectively apply and remove voltage to the sensing terminals of the alternator voltage regulator 15. The base of transistor 22 is also connected by a bias resistor 40 to the positive polarity battery bus.

Zener diode 38, resistor 39 and resistor 40 comprise a three element voltage divider which effectively biases transistor 22 into cut-off when the output of comparator amplifier 33 is high, and into conduction when the output of comparator amplifier 33 is low. As previously mentioned, this has the effect of applying sensing voltage to regulator 15 for reduced charging current when the battery terminal voltage is higher than the reference voltage, and of removing sensing voltage when the battery terminal voltage is low for maximum charging current.

Figure 3:
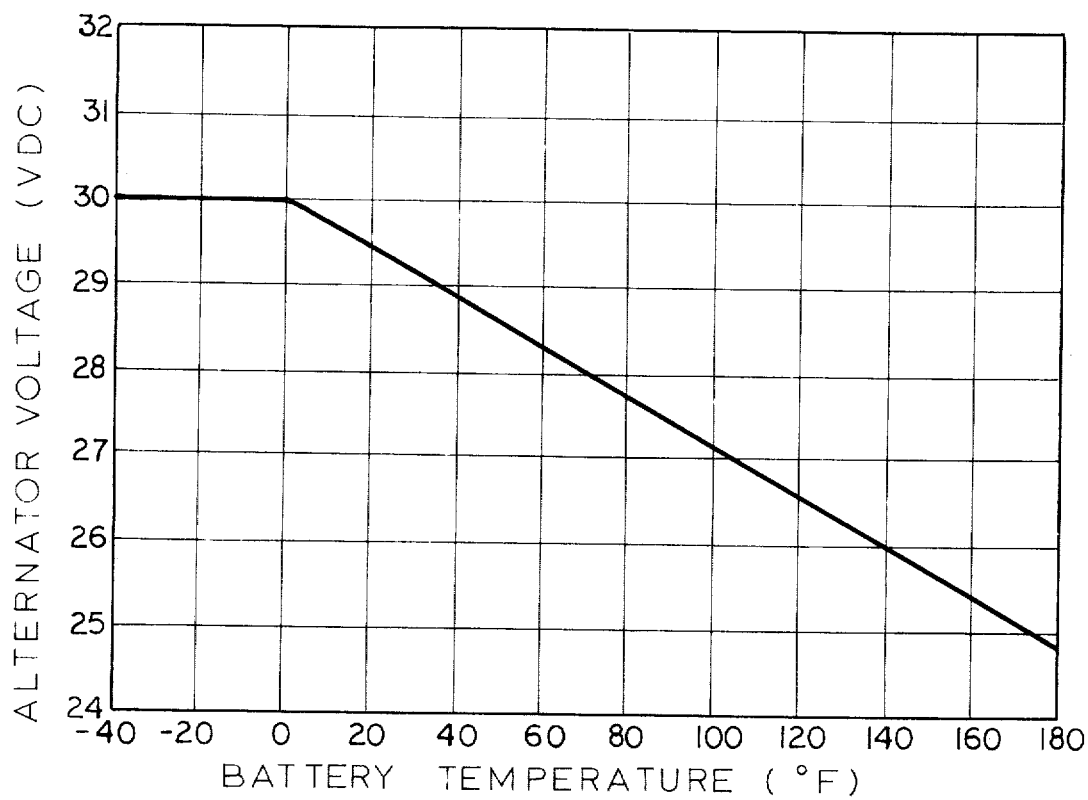
FIG. 3 is a plot of the battery charging system output voltage as a function of battery temperature which is useful in explaining the operation of the system.

It will be appreciated that the voltage level at which voltage regulator 15 causes generator 14 to charge battery 10 is dependent on the temperature of the battery, as sensed by sensor 11. When the battery temperature is low, the reference voltage applied to comparator amplifier 33 is high so that the full output of alternator 14 will be applied to the battery for a longer period, i.e. until the battery voltage sensed at the inverting terminal of comparator amplifier 33 rises above the reference voltage applied to the non-inverting input terminal of that stage. Conversely, when the temperature of battery 10 is high, the reference signal applied to comparator amplifier 33 is low and the charging current from alternator 14 lasts for a relatively short duration. The effect of temperature on the battery charging voltage can be seen by reference to FIG. 3, which is a plot of alternator voltage vs. battery temperature.

Provision may be made in the battery charge control circuit 16 for suppression of transients. To this end, a capacitor 14 is connected between the non-inverting input of differential amplifier 31 and the juncture of zener diode 24 and resistor 25. Also, provision may be made for adjusting circuit time constants to exclude excessively short voltage variations. To this end, a capacitor 42 is shunt-connected across resistor 36 to form, in conjunction with resistors 35 and 36, an RC filter network to prevent comparator amplifier 33 from responding to high frequency components such as may exist on the battery bus.

A primary advantage of the present charging system is that control circuit 16 can be added as an integral unit to an existing nickel cadmium battery type aircraft power system. All that is required is to locate temperature sensor 11 in thermal communication with the battery, and rewire the positive sensing terminal of the system voltage regulator through the charge control circuit. No modification is required to the voltage regulator or alternator, since the control circuit functions by alternately applying and not applying a sensing voltage to the regulator to alternately excite and not excite the aircraft alternator to establish a charging voltage across the battery dictated by the temperature of the battery. A mimimum amount of modification is required to the aircraft electrical system and a minimum number of additional components are required, since the original voltage regulator and alternator are employed intact.

As a result of the present invention operation of nickel cadmium batteries at excessive temperature is precluded, which increases the life of the batteries and obviates the possibility of a catastrophic failure within the aircraft.

While the illutrated charge control circuit 16 works on a switching principle, i.e. excitation being either applied or removed from the alternator, it would also be possible to operate on a linear principle wherein the sensing voltage applied to the aircraft alternator voltage regulator would be added to or subtracted from to obtain a steady-state output from the alternator at a voltage level commensurate with the battery temperature. It will also be appreciated that other circuit arrangements are possible, and that discrete circuitry could be employed instead of the operational-type amplifiers shown in the illustrated embodiment. Furthermore, while the circuit is shown powered from the system battery bus, it would be possible to provide another independent source of unidirectional current, separate from the battery bus, for supplying regulator 15 and control circuits 16, with the exception of resistors 35 and 36, which necessarily sense battery voltage. Furthermore, while the system has been shown in connection with nickel cadmium batteries, it may be used with other types of batteries where temperature protection is desired with minimal modification to an existing system.

It will be understood that modifications and variations may be effected without departing from the scope of the novel concepts of the present invention, but it is understood that this application is to be limited only by scope of the appended claims.

The invention hereby claimed as follows:

1. In an electrical system of the type having a nickel cadmium battery, a source of unidirectional charging current, and a voltage regulator for controlling the output voltage of said source of unidirectional current in accordance with an applied sensing voltage related to the voltage level of said system, said voltage regulator causing said current source to operate at a predetermined maximum voltage level in the absence of said applied sensing voltage and at lesser voltage levels in the presence of said applied sensing voltage, a battery charge control and thermal runaway protection circuit comprising, in combination:

temperature sensing means including a sensor in thermal communication with said battery for generating a temperature-dependent reference signal; and battery charge control means responsive to said reference signal and to the terminal voltage of said battery for terminating the application of sensing voltage to said voltage regulator for maximum charging effort when the terminal voltage of said battery falls below a predetermined level dependent on the temperature of said battery, and for applying sensing voltage to said regulator for reduced charging effort when the terminal voltage of said battery exceeds said predetermined level.

2. A battery charge control and thermal runaway protection circuit as defined in claim 1 wherein said source of unidirectional charging current comprises a generator including a field winding, and wherein said voltage regulator controls the application of excitation current to said field winding to maintain the voltage level of said system constant.

3. A battery charge control and thermal runaway protection circuit as defined in claim 1 wherein said battery charge control means comprise a comparison amplifier for effecting a comparison between at least a portion of said battery terminal voltage and said temperature-dependent reference signal, and switch means responsive to the output of said comparison amplifier for controlling application of sensing voltage to said voltage regulator.

4. A battery charge control and thermal runaway protection circuit as defined in claim 1 wherein said temperature sensing means further comprise a constant-voltage source, a bridge circuit coupled between said constant-voltage source and ground, and a first differential amplifier having its input terminals coupled across the center of said bridge, and wherein said temperature sensor comprises a temperature-dependent resistance included in one leg of said bridge to produce a temperature-dependent reference output signal from said amplifier.

5. A battery charge control and thermal runaway protection circuit as defined in claim 4 wherein said temperature-dependent resistance has a positive temperature coefficient, and wherein said reference signal varies inversely with temperature.

6. A battery charge control and thermal runaway protection circuit as defined in claim 3 wherein the application of sensing voltage to said regulator is terminated when said portion of said battery terminal voltage falls below said reference voltage, and re-established when said portion of said battery terminal voltage rises above said reference voltage.

7. A battery charge control and thermal runaway protection circuit as defined in claim 4 wherein said battery charge control means comprise a second differential amplifier having a first input terminal coupled to the output of said first differential amplifier, and a second input terminal coupled to the terminals of said battery.

8. In an electrical system of the type having a nickel cadmium battery, a source of unidirectional charging current, and a voltage regulator for controlling the output voltage of said source of unidirectional current in accordance with an applied sensing voltage related to the voltage level of said system, a charge control and thermal runaway protection circuit comprising, in combination:

temperature sensing means including a sensor in thermal communication with said battery for generating a temperature-dependent reference signal; and battery charge control means responsive to said reference signal and to the terminal voltage of said battery for selectively terminating the application of sensing voltage to said voltage regulator according to the terminal voltage and temperature of said battery to reduce the potential for thermal runaway in said battery while maintaining said battery fully charged.

9. A battery charge control and thermal runaway protection circuit as defined in claim 8 wherein said source of unidirectional charging current comprises a generator including a field winding, and wherein said voltage regulator controls the application of excitation current to said field winding to maintain the voltage level of said system constant.

10. A battery charge control and thermal runaway protection circuit as defined in claim 8 wherein the application of sensing voltage to said regulator is terminated when said battery terminal voltage exceeds said reference voltage, and re-established when said battery terminal voltage falls below said reference voltage.

* * * * *

UNITED STATES PATENT AND TRADEMARK OFFICE
CERTIFICATE OF CORRECTION

PATENT NO. : 3,895,283
DATED : July 15, 1975
INVENTOR(S) : Bruce E. Peterson

It is certified that error appears in the above-identified patent and that said Letters Patent are hereby corrected as shown below:

Col. 2, Line 21: After "." begin new paragraph.
Col. 4, Line 30: Change "one" to --One--.
        Line 37: Change "Dc" to --DC--.

Line 54: Change "position" to --positive--.

Signed and Sealed this sixth Day of April 1976

[SEAL]

Attest:

RUTH C. MASON
*Attesting Officer*

C. MARSHALL DANN
*Commissioner of Patents and Trademarks*